(12) United States Patent
Kimijima et al.

(10) Patent No.: US 7,846,275 B2
(45) Date of Patent: Dec. 7, 2010

(54) HIGH STRENGTH HOT ROLLED STEEL SHEET HAVING EXCELLENT STRETCH FLANGEABILITY AND ITS PRODUCTION METHOD

(75) Inventors: Kazuya Kimijima, Kakogawa (JP); Tetsuo Soshiroda, Kakogawa (JP)

(73) Assignee: Kobe Steel, Ltd., Kobe-shi (JP)

(*) Notice: Subject to any disclaimer, the term of this patent is extended or adjusted under 35 U.S.C. 154(b) by 331 days.

(21) Appl. No.: 11/734,556

(22) Filed: Apr. 12, 2007

(65) Prior Publication Data
US 2007/0272333 A1 Nov. 29, 2007

(30) Foreign Application Priority Data
May 24, 2006 (JP) .............................. 2006-144594

(51) Int. Cl.
C22C 38/22 (2006.01)
C21D 8/02 (2006.01)
(52) U.S. Cl. .................... 148/335; 148/334; 148/602; 148/654
(58) Field of Classification Search ................ 148/602, 148/654, 320, 333–335; 420/104, 105, 106, 420/108
See application file for complete search history.

(56) References Cited

U.S. PATENT DOCUMENTS

| | | | |
|---|---|---|---|
| 3,288,600 | A | 11/1966 | Johnsen, Jr. et al. |
| 6,284,063 | B1 | 9/2001 | Espenhahn et al. |
| 6,666,932 | B2 | 12/2003 | Funakawa et al. |
| 2004/0035508 | A1 | 2/2004 | Okada et al. |
| 2006/0113012 | A1 | 6/2006 | Okamoto et al. |

FOREIGN PATENT DOCUMENTS

| | | |
|---|---|---|
| EP | 1 149 925 A1 | 10/2001 |
| EP | 1 325 966 A1 | 7/2003 |
| EP | 1 375 694 | 1/2004 |
| EP | 1 607 489 A1 | 12/2005 |
| GB | 2 195 658 A | 4/1988 |
| JP | 9-263883 | 10/1997 |

(Continued)

OTHER PUBLICATIONS

Machine-English translation of Korean patent 2003-0054377, Jul. 2, 2003, Hae-Chag Choi.*

(Continued)

*Primary Examiner*—Deborah Yee
(74) *Attorney, Agent, or Firm*—Oblon, Spivak, McClelland, Maier & Neustadt, L.L.P.

(57) ABSTRACT

Disclosed is a hot rolled steel sheet in which it includes a steel having a chemical composition of 0.03 to 0.10% (the percent hereinafter representing % by mass) of C, 0.2 to 2.0% of Si, 0.5 to 2.5% of Mn, 0.02 to 0.10% of Al, 0.2 to 1.5% of Cr, 0.1 to 0.5% of Mo, and the residue of iron and inevitable contaminants, and in this steel sheet, at least 80% by area in longitudinal cross section has a martensitic structure. As a consequence, a high strength hot rolled steel sheet having a tensile strength of the level as high as 980 MPa or higher simultaneously with an excellent forming workability, and in particular, excellent stretch flangeability is provided at a relatively low cost.

17 Claims, 6 Drawing Sheets

FOREIGN PATENT DOCUMENTS

| | | |
|---|---|---|
| JP | 2000-109951 | 4/2000 |
| JP | 2002-180189 | 6/2002 |
| JP | 2003-89848 | 3/2003 |
| JP | 2003-105446 | 4/2003 |
| JP | 2004-204326 | 7/2004 |
| JP | 2004-285420 | 10/2004 |
| JP | 2004-315882 * | 11/2004 |
| KR | 2003-0054377 | 7/2003 |
| WO | 2006/132441 | 12/2006 |

OTHER PUBLICATIONS

Machine English translation of Japanese patent 2004-315882, Shigeto Takebayashi et al., Nov. 11, 2004.*

* cited by examiner

AMOUNT OF MARTENSITE (% BY AREA)

HIGH STRENGTH HOT ROLLED STEEL SHEET HAVING EXCELLENT STRETCH FLANGEABILITY AND ITS PRODUCTION METHOD

BACKGROUND OF THE INVENTION

This invention relates to a high strength hot rolled steel sheet having an excellent stretch flangeability together with a high tensile strength of the level, for example, at least 980 MPa, and its production method. This hot rolled steel sheet is useful as a material for use in reinforcing, for example, a member, a bumper, or a pillar of an automobile.

Development is underway to provide hot rolled steel sheets having a high strength as measured by tensile strength of the level as high as 980 MPa or higher simultaneously with an improved stretch flangeability for realizing high forming workability. Means that have been used in realizing the high stretch flangeability include use of a single phase structure such as ferrite or bainitic ferrite for the metal structure, and use of a complex structure of ferrite and bainite in which difference in strength between the two phases is suppressed to the least level. Also known are techniques using precipitation strengthening by microalloying that have been used to realize the high strength while maintaining such structure. For example, Japanese Patent Application Laid-Open Nos. 2000-109951, 2002-180189, 2003-89848, 2004-204326, and 2004-285420 disclose attempts to attain the high strength by adding Ti, which is an element used for precipitation strengthening.

In the meanwhile, Japanese Patent Application Laid-Open No. 2003-105446 discloses a technique for realizing the high strength and the workability which does not use the precipitation strengthening of the alloying element. In this technique, such properties are realized by forming a metal structure predominantly including martensite by rapidly quenching the hot rolled steel sheet immediately after the hot rolling.

These techniques, however, suffer from various problems. In the techniques using precipitation strengthening by the addition of a microalloy as mentioned above, the slab should be reheated to a high temperature before the hot rolling due to the addition of Ti and the like at a high content, and such use of high temperature is disadvantageous in terms of heat energy. Improvement of the strength by such use of precipitation strengthening by the addition of Ti and the like is also associated with the problem of significant increase of yield ratio, which results in the poor form stability after the pressing.

SUMMARY OF THE INVENTION

In view of the problems of the prior art techniques as described above, an object of the present invention is to provide a hot rolled steel sheet which has realized the high strength simultaneously with the high level stretch flangeability not by means of precipitation strengthening but by producing a metal structure predominantly including martensite. Another object of the present invention is to provide a method useful for producing such a hot rolled steel sheet.

According to one aspect of the present invention, the hot rolled steel sheet which has obviated the situation as described above includes 0.03 to 0.10% of C (the percent hereinafter representing % by mass in the case of chemical components),
0.2 to 2.0% of Si,
0.5 to 2.5% of Mn,
0.02 to 0.10% of Al,
0.2 to 1.5% of Cr, and
0.1 to 0.5% of Mo, and in this hot rolled steel sheet, martensitic structure occupies at least 80% by area in the longitudinal cross section.

According to the aspect of the present invention, the hot rolled steel sheet may further contain 0.0005 to 0.0050% of B, 0.1 to 2.0% of Ni, or 0.0005 to 0.0050% of Ca.

According to the aspect of the present invention, the hot rolled steel sheet preferably has a strength level as measured by tensile strength of at least 980 MPa.

The method according to the aspect of the present invention is a method well adapted for producing the hot rolled steel sheet having the properties as described above, and in this method, the hot rolling is conducted at a finishing delivery temperature of not lower than $Ar_3$ transformation temperature, and the steel sheet after the completion of the hot rolling is cooled at a rate of at least 30° C./sec and coiled at a temperature of less than 400° C.

In the aspect of the present invention, a high strength hot rolled steel sheet having a high strength as measured by tensile strength of the level as high as 980 MPa or higher simultaneously with an excellent forming workability, and in particular, excellent stretch flangeability is provided at a relatively low cost not by using the precipitation strengthening by Ti, Nb, V, or the like but by producing a steel sheet predominantly including martensitic structure which has higher strength compared to ferrite or bainite structure and by controlling content of C, Mo, and the like to an adequate ranges.

BRIEF DESCRIPTION OF THE DRAWINGS

Embodiments of the present invention will be described in detail based on the following figures, wherein.

DETAILED DESCRIPTION OF THE INVENTION

Figure 1:
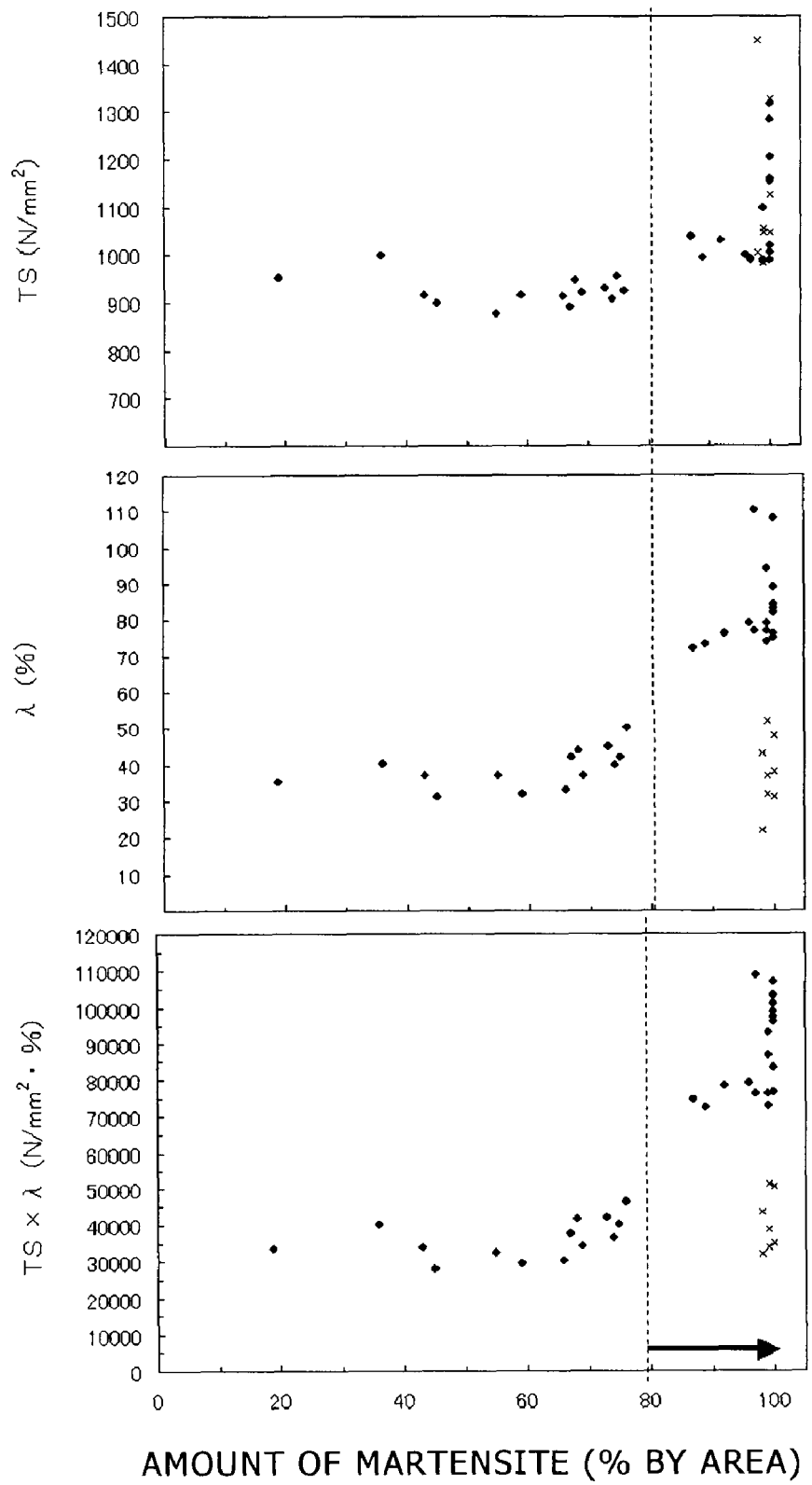
FIG. 1 presents graphs showing effects of the amount of martensite on the tensile strength and stretch flangeability in the Examples.

In view of the situation as described above, the inventors of the present invention made an intensive study to improve the strength of the steel by providing a metal structure which predominantly includes martensite, and to simultaneously provide such steel with improved workability, and in particular, with stretch flangeability. As a consequence of such study, the inventors found that a steel having a metal structure predominantly including martensite which, nevertheless, has improved stretch flangeability can be provided, first, by producing a steel having a C content lower than that of the conventional martensite steel, and second, by adding an adequate amount of Mo in the steel. The present invention has been achieved on the bases of such findings.

Next, the present invention is described in detail by referring to the reasons why the chemical composition and the metal structure of the steel material have been limited as defined in the invention.

First, chemical components of the steel material are described together with the reason for the limitation of their content.

C: at least 0.03% and up to 0.10%

C is an element indispensable for improving hardenability and for increasing the strength by generating martensite which is a low temperature transformation phase, and at least 0.03% of C, and preferably, at least 0.04% of C is required to reliably generate the martensite structure at the amount defined in the present invention to thereby realize the tensile strength of the level as high as 980 MPa or higher. However, while the strength improves with the increase in the C content, C content in excess of 0.10% results in rapid loss of the stretch flangeability which is another property that should be realized in the present invention, and the poor stretch flangeability results in reduced workability. Accordingly, the C content should be limited to 0.10% or less, and preferably, to the range not exceeding 0.08%.

Si: at least 0.2% and up to 2.0%

Si is an element which improves strength of the steel by the presence as solid solution, and Si is added at an amount corresponding to the required strength. Si also has the effect of suppressing generation of cementite which is responsible for the poor stretch flangeability. Accordingly, Si is incorporated at least at 0.2%, and preferably, at least at 0.5%. However, presence of Si in excess of 2.0% invites surface defects, and the steel becomes less adapted to pickling and coating. Therefore, upper limit of Si is set at 2.0%.

Mn: at least 0.5% and up to 2.5%

Mn has the action of improving hardenability to thereby facilitate generation of products of low temperature transformation, and incorporation of at least 0.5% is necessary to reliably realize the tensile strength at the level of 980 MPa or higher. However, this action saturates at the Mn content of about 2.5%, and further addition does not realize any additional effects and such incorporation results in the formation of a band structure by segregated solidification which leads to poor workability and low resistance to delayed fracture. Therefore, Mn should be incorporated at a content of up to 2.5%, and more preferably, Mn is incorporated at a content of at least 1.0% and up to 2.0%.

Al: at least 0.02% and up to 0.10%

Al acts as a deoxidizing agent. Al is also an element indispensable for improving workability of the steel sheet since it immobilizes N (nitrogen) present in the steel as an inevitable contaminant, and Al should be incorporated at an amount of at least 0.02%. However, excessive Al acts as a source of non-metal inclusions which results in poor surface properties, and the upper limit of Al is 0.10%. More preferably, Al is incorporated at a content of at least 0.03% to up to 0.05%.

Cr: at least 0.2% and up to 1.5%

Cr has the action of improving hardenability, and in the course of cooling after completing the hot rolling, Cr suppresses the development of ferrite and bainite structures to thereby facilitate generation of the martensitic structure. In order to effectively utilize such action, Cr should be incorporated at a content of at least 0.2%. The action, however, saturates at about 1.5%, and further incorporation results in the loss of feasibility for chemical conversion treatments, and therefore, upper limit for the Cr is set at 1.5%. More preferably, Cr is incorporated at a content of at least 0.5% to up to 1.0%.

Mo: at least 0.1% and up to 0.5%

Mo is the most important element in the present invention, and it is indispensable to obtain a structure predominantly including martensite having a high stretch flangeability. For example, a metal structure predominantly including martensite can also be obtained by using an element which improves hardenability such as C, Mn, or Cr. However, metals other than Mo are incapable of simultaneously realizing the high strength and the excellent stretch flangeability, and therefore, addition of an adequate amount of Mo is indispensable for attaining the object of the present invention.

The reason why use of Mo enables generation of the martensitic structure having a high stretch flangeability is not yet found out. However, it is conceived that the steel of the present invention which has a low C content has a high Ms point, and when the steel sheet which has experienced the martensitic transformation at a relatively high temperature in the course of cooling after the hot rolling further cools to the coiling temperature, precipitates are formed under self tempering conditions to result in the poor stretch flangeability. It is also conceived that, when Mo is used, the Mo added suppresses the formation of such precipitates under the self tempering conditions to thereby prevent the loss of the stretch flangeability.

For the development of such effects, Mo should be incorporated at least at 0.1%. In the meanwhile, such effects saturate by the addition at about 0.5%, and further addition is economically disadvantageous. Preferably, Mo is used at a content of at least 0.2% to up to 0.4%.

The essential constituent elements used in the present invention are as described above, and the residue substantially includes Fe. The term "substantially" means that inclusion of inevitable contaminant elements such as P (phosphorus), S (sulfur), N (nitrogen), and O (oxygen) are allowable, and in order to prevent adverse effects caused by such elements, content of P is preferably suppressed to the level of up to 0.015%, content of S is preferably suppressed to the level of up to 0.01%, content of N is preferably suppressed to the level of up to 0.005%, and content of O is preferably suppressed to the level of up to 0.003%.

P has the effect of improving the strength by being present in the steel as solid solution. However, excessive amount of P results in the segregation of P at the grain boundary and this adversely affects the impact resisting properties and workability in the cold rolling. Therefore, content of P should be minimized to the least level, and P content is preferably up to 0.015%, and more preferably up to 0.010%.

S acts as a source of non-metal inclusions such as MnS which invite loss of workability, and therefore, content of S should be minimized to the least level. While such adverse effects of S may be suppressed by adding an adequate amount of Ca in order to control shape of such S inclusions responsible for the loss of workability, even in such case, content of S should be reduced to up to 0.01% in order to reliably prevent the loss of workability by the S.

Incorporation of a minute amount of N and O is inevitable since these elements are present in the atmosphere during the melting. Since these elements adversely affects workability and other properties of the product by being the source of non-metal inclusions, N content should be reduced to the level of up to 0.005%, and more preferably, to the level of up to 0.003%, and O content should be reduced to the level of up to 0.003%, and more preferably, to the level of up to 0.001%.

In addition to the elements as described above, the steel used in the present invention may also have optional elements as described below added for the purpose of providing the steel sheet with additional properties as desired, and those having such optional elements added are also within the scope of the present invention.

B: 0.0005 to 0.005%

B improves hardenability as in the case of Cr and Mo, and facilitates martensite transformation by suppressing ferrite or bainite transformation. This effect is realized by the addition of extremely minute amount at the level of about several ppm. However, B is preferably added at a content of at least 0.0005%, and preferably, at a content of at least 0.0010%. However, the effect of adding B saturates at about 0.005%, and therefore, B is preferably added at a content not exceeding such level in consideration of economy.

Ni: 0.1 to 2.0%

Ni has the effect of suppressing delayed fracture while it has little effects on the strength or the bainite transformation. Therefore, Ni may be added at an adequate amount when improvement of resistance to the delayed fracture is particularly required. In order to realize the effect of suppressing the delayed fracture, Ni is preferably incorporated at a content of at least 0.1%, and more preferably, at a content of at least 0.2%. However, the effect of Ni addition saturates at about 2.0%, and therefore, incorporation in excess of 2.0% should be avoided in economical point of view.

Ca: 0.0005 to 0.0050%

Ca controls the form of the S inclusions which are included as inevitable contaminants, and alleviates the adverse effects on the workability. In order to realize such effect of Ca, Ca is preferably added at a content of at least 0.0005%, and more preferably at a content of at least 0.0010%. However, the effects of Ca addition saturates at a certain level and excessive addition is disadvantageous in terms of economy, and therefore, Ca should be added at a content of up to 0.0050%.

The steel sheet of the present invention has the chemical composition as described above, and more specifically, a hot rolled steel sheet simultaneously having a tensile strength of the level as high as 980 MPa or higher and an improved stretch flangeability is realized not by using the precipitation strengthening by Ti, Nb, or V but by adding an adequate amount of Mo with an adequate amount of Si and Cr while reducing the C content and providing a metal structure predominantly including martensite structure exhibiting a strength higher than ferrite or bainite structure. In order to realize the strength and the stretch flangeability of the level intended in the present invention, area percentage of the martensite in the entire metal structure should be at least 80%, and preferably at least 90%, and more preferably, substantially 100% of the metal structure includes the martensitic structure.

The type of the structures other than the martensite which may be present at a level of less than 20% by area is not particularly limited, and exemplary such structures include ferrite structure, bainite structure, and residual austenite structure which may be present alone or in combination of two or more. The metal structure can be determined, for example, by etching the longitudinal cross-section of the steel sheet with a repeller, subjecting the surface to C vacuum deposition using a vacuum deposition apparatus "JEE-4X" manufactured by JEOL Ltd., and observing the structure (at a magnification of ×1000) by EPMA "JXA-8100" manufactured by JEOL Ltd., and analyzing the structure by an image analyzer "LUZEX-F" manufactured by NIRECO.

Next, the method for producing the hot rolled steel sheet of the present invention is described mainly in relation to the conditions required for realizing such metal structure.

The hot rolled steel sheet of the present invention is produced by heating (soaking) the steel ingot having the composition satisfying the requirements as described above, hot rolling the heated ingot, cooling and coiling the resulting steel sheet, and in this process, the ingot is heated to a temperature required for the added elements to be present as solid solution, which is typically at least 1000° C. and less than 1200° C. More specifically, while Ti, Nb, and V which are typical elements used for precipitation strengthening requires a heating to a temperature as high as 1200 to 1300° C. or higher to be in solid solution in the austenite structure, in the case of the steel sheet having the compositional system as described above, the elements added are fully in solid solution by heating to a temperature of at least 1000° C. and not exceeding 1200° C. The time used for the soaking is not particularly limited, and the elements added as described above will be in solid solution in about 120 minutes. However, for reliability, the soaking is preferably conducted for about 200 to 240 minutes, and soaking for 300 minutes or longer is unnecessary because such heating only contributes for the loss of productivity.

In the hot rolling after the soaking, the steel sheet is rolled at a finishing delivery temperature which is not lower than the $Ar_3$ transformation temperature, and the steel sheet is then cooled to the coiling temperature at an average cooling rate of at least 30° C./sec and the coiling is conducted at a temperature lower than 400° C. When the finishing delivery temperature in the hot rolling is lower than the $Ar_3$ transformation temperature, amount of ferrite generated increases. Since this ferrite phase remains after the working, and the remaining ferrite in turn invites loss of ductility as well as increase in in-plane anisotropy which lead to deterioration of the steel quality. More preferably, the hot rolling is conducted at a finishing delivery temperature of "Ar transformation temperature+at least 30° C.". While the finishing delivery temperature is not particularly limited for its upper limit, the upper limit is believed to be "Ar transformation temperature+about 80° C." when thermal efficiency, productivity, and the like are totally considered.

The cooling rate after the hot rolling should be at least 30° C./sec, and more preferably at least 50° C./sec in order to minimize the generation of the product of the low temperature transition such as the polygonal ferrite or the bainite and increase the proportion of the martensite structure. When the average cooling rate after the hot rolling is less than 30° C./sec, nonnegligible amount of polygonal ferrite or bainite will be generated in the course of cooling step, and the area percentage of the martensite (at least 80% by area) intended in the present invention will not be reliably obtained.

The austenite remaining after the hot rolling and the cooling will transform into martensite, and in the compositional system of the present invention as described above, the transformation of the austenite to the martensite is realized by coiling the cooled steel sheet at the coiling temperature of lower than 400° C., and more preferably, at a temperature not higher than 350° C., and as a consequence, the desired area percentage of the martensite is realized. When the coiling is conducted at a temperature of 400° C. or higher, 20% or more of the austenite will transform to the bainite, and when the coiling temperature is further increased, ferrite transformation as well as pearlite transformation will take place, and in such a case, the area percentage of the martensite of at least 80% by area will never be realized.

As described above, the high strength hot rolled steel sheet of the present invention is produced by using a steel material having the predetermined chemical composition and by adequately controlling the finishing delivery temperature of the hot rolling and the cooling rate and the coiling temperature after the hot rolling, and as a consequence, the present invention has enabled to provide a high strength hot rolled steel sheet having a high strength of the level as high as 980 MPa or higher together with the improved workability with a good stretch flangeability at a reduced cost.

EXAMPLES

Next, the present invention is described in further detail by referring to Experiments which by no means limit the scope of the present invention. The present invention can be implemented by modifying the present invention to the extent consistent with the intention of the present invention as described above and below, and all such modifications are within the technical scope of the present invention.

Experiments

The steel material having the composition as shown in Table 1 was melted by vacuum melting process, and cast to produce a cast ingot. The ingot was hot rolled under the conditions shown in Tables 2 and 3 to thereby produce a hot rolled steel sheet. The resulting hot rolled steel sheet was confirmed for their metal structure by the procedure as described below, and the physical properties were also measured by the procedure as described below. The results are shown in Tables 2 and 3.

[Metal Structure]

Structure identification: Longitudinal crossection of the steel sheet was etched with a repeller to enable visual distinction between martensite phase and other phases. Next, C vacuum deposition was conducted by using vacuum deposition apparatus "JEE-4X" manufactured by JEOL Ltd., and the structure was observed by EPMA "JXA-8100" also manufactured by JEOL Ltd. at a magnification of 1000. Based on this observation, area percentage of martensite was determined by image analyzer "LUZEX-F" manufactured by NIRECO.

[Tensile strength (TS, MPa), yield strength (YS, MPa), elongation rate (El, %), and yield ratio (YR, YS/TS)]

Test piece for tensile test according to JIS 5 was prepared from the sample steel sheet, and the evaluation was conducted by tensile tester "AG-100" manufactured by Shimadzu Corporation.

[Hole Expansion Ratio ($\lambda$, %)]

A hole having an initial hole diameter (d1) of 10 mm was punched through the sample steel sheet, and this hole was dilated with a conical punch having an apical angle of 60°. When the crack generated reached the other surface of the steel sheet, hole diameter ($d_2$) was measured to determine the hole expansion ratio ($\lambda$, %) by the following equation. This is a value commonly adopted as an index for evaluating stretch flangeability which is one index for forming workability.

Hole expansion ratio ($\lambda$, %)=$(d_2-d_1)\times100/d_1$

[Table 1]
[Table 2]
[Table 3]

Tables 1 to 3 indicate the following.

In Tables 1 to 3, Experiment Nos. 1 to 4, 8 to 13, 15 to 19, and 21 to 33 evaluated effects of the C content and Mo content by using Steel type Nos. 1 to 14. In Experiment Nos. 25 to 28, C content was below the range of the present invention, and shortage in the amount of martensite resulted in both the low tensile strength and the low hole expansion ratio ($\lambda$). In Experiment Nos. 29, C content was in excess of the range of the present invention, and the hole expansion ratio ($\lambda$) was low. In Experiment Nos. 30 to 32, hole expansion ratio ($\lambda$) was low due to the absence of Mo despite the adequate amount of the martensite. In Experiment No. 33, C content was in excess of the range of the present invention and Mo was absent, and the hole expansion ratio ($\lambda$) was low. In Experiment No. 40, Mo content was below the range of the present invention, and the hole expansion ratio ($\lambda$) was low.

On the other hand, Experiment Nos. 34 to 39 evaluated effects of Si, Mn, and Cr contents by using steel type Nos. 15 to 17. In Experiment Nos. 34 and 35, Si content was below the range of the present invention, and since generation of cementite could not be sufficiently prevented, hole expansion ratio ($\lambda$) was low. In Experiment No. 36, Mn content was below the range of the present invention, and due to the insufficient amount of the martensite, both tensile strength and hole expansion ratio ($\lambda$) were low. In Experiment Nos. 37 to 39, Cr content was below the range of the present invention, and due to the insufficient amount of the martensite, both tensile strength and hole expansion ratio ($\lambda$) were low.

In Experiment Nos. 1 to 20, the effect of adding optional elements was evaluated by using Steel type Nos. 1 to 7. The samples produced under the conditions satisfying the production conditions of the present invention all attained the desired strength and structure as well as workability.

More specifically, Experiment Nos. 2 to 7 evaluated effect of the coiling temperature. In Experiment Nos. 2 to 4, the steel sheets coiled at a temperature within the range of the present invention (lower than 400° C.) exhibited the predetermined strength as well as good stretch flangeability. In Experiment Nos. 5 to 7, the steel sheet was coiled at a temperature in excess of the range of the present invention, and the amount of the martensitic structure was less than 80% and the hole expansion ratio ($\lambda$) was low.

Experiment Nos. 13 to 14 and 19 to 20 evaluated the effects of cooling rate after completing the hot rolling, and the results confirmed that the predetermined tensile strength and hole expansion ratio ($\lambda$) could be attained when the cooling conditions of the present invention (at least 30° C./sec) was satisfied.

Experiment Nos. 15 to 17 evaluated the effects of the temperature to which the slab is heated, and it was revealed that when the slab was heated to a temperature of at least 1000° C., a steel sheet having both the strength and the workability desired in the present invention can be produced.

Experiment Nos. 21 to 23 evaluated the effects of the finishing delivery temperature in the hot rolling, and since the predetermined amount of martensite was realized by the finishing delivery temperature which is higher than the $Ar_3$ transformation temperature, the steel strep had strength and hole expansion ratio ($\lambda$) of the level intended in the present invention.

FIGS. 1 to 5 are graphs respectively showing the effects of the amount of martensite, the C content, the Mo content, the coiling temperature, and the cooling rate after the hot rolling on the tensile strength and the stretch flangeability based on the experimental data as described above. In each graph, the case is indicated by "×" when the chemical component or the hot rolling conditions of the steel is outside the scope of the present invention even if the item indicated in the X axis were within the scope of the present invention (as indicated by broad solid line).

Figure 2:
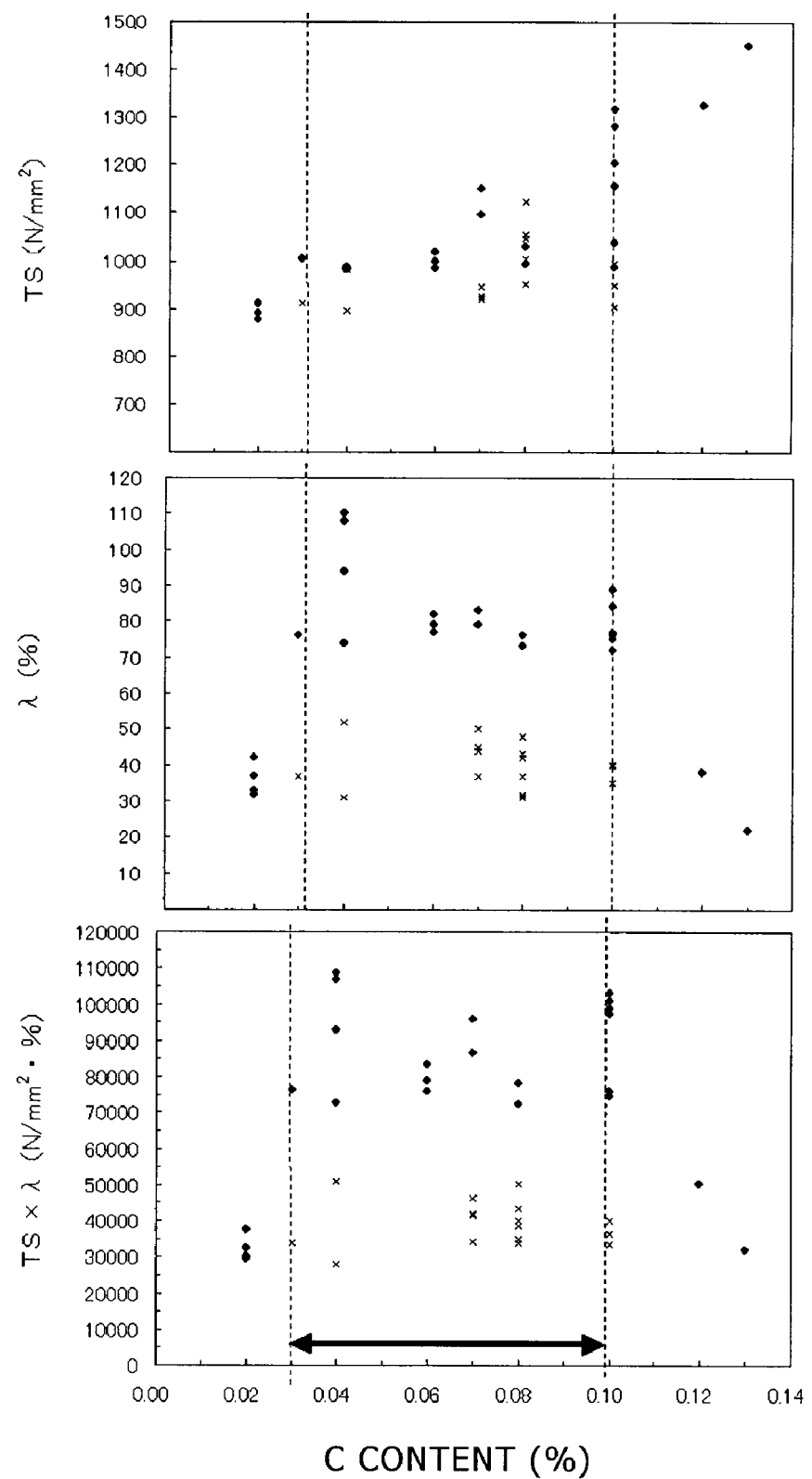
FIG. 2 presents graphs showing effects of C content on the tensile strength and stretch flangeability in the Examples.
Figure 3:
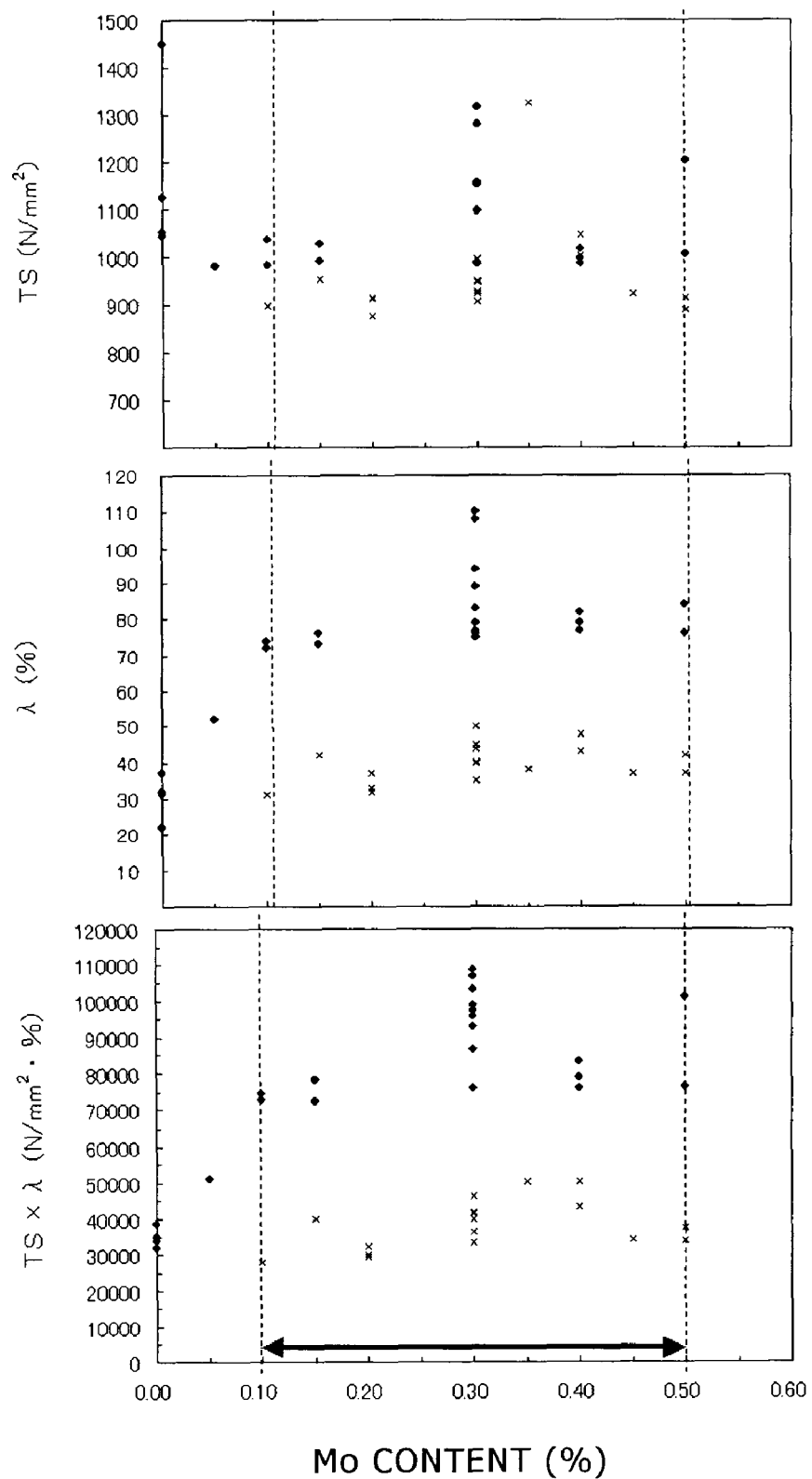
FIG. 3 presents graphs showing Mo content on the tensile strength and stretch flangeability in the Examples.
Figure 4:
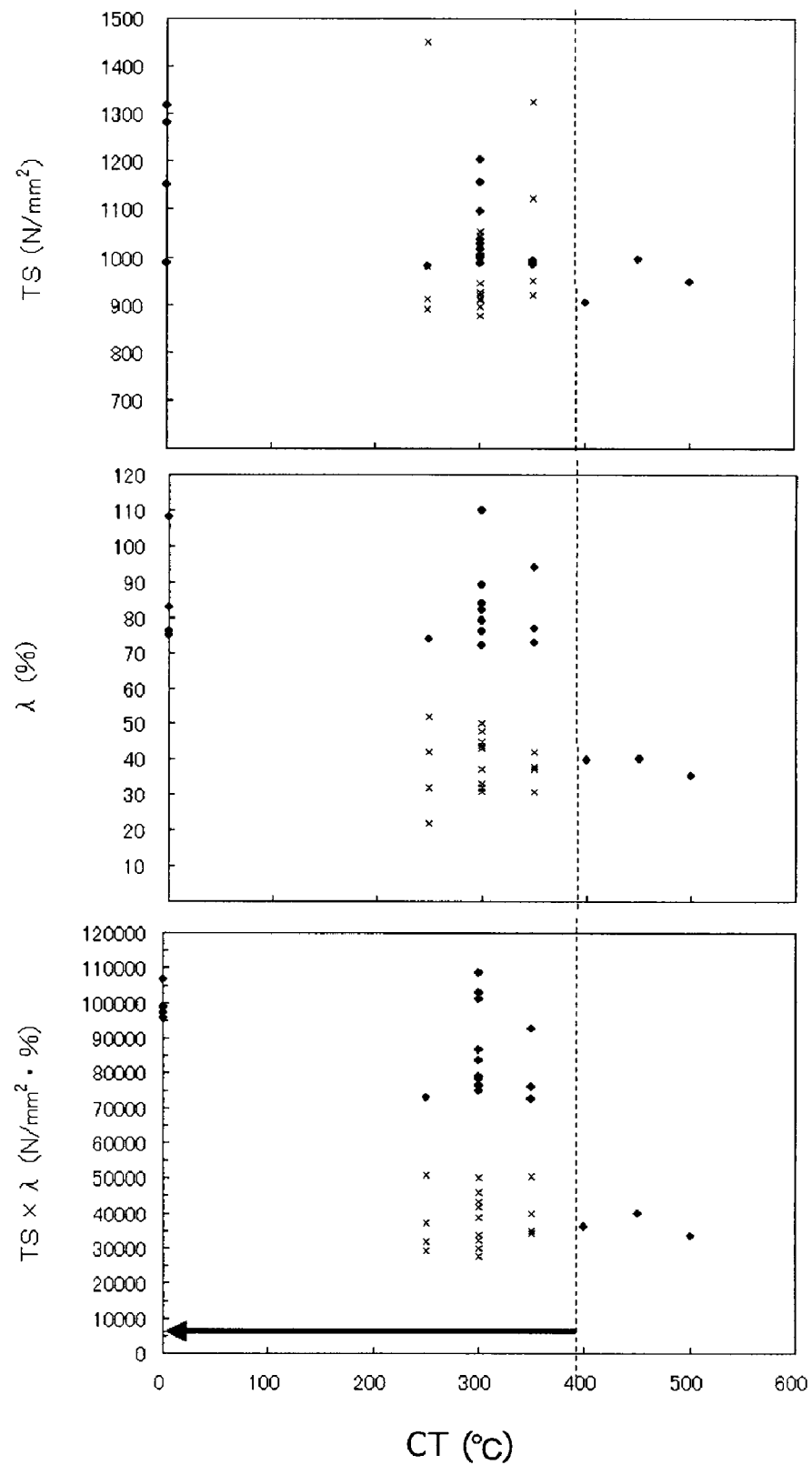
FIG. 4 presents graphs showing effects of coiling temperature (CT) on the tensile strength and stretch flangeability in the Examples.
Figure 5:
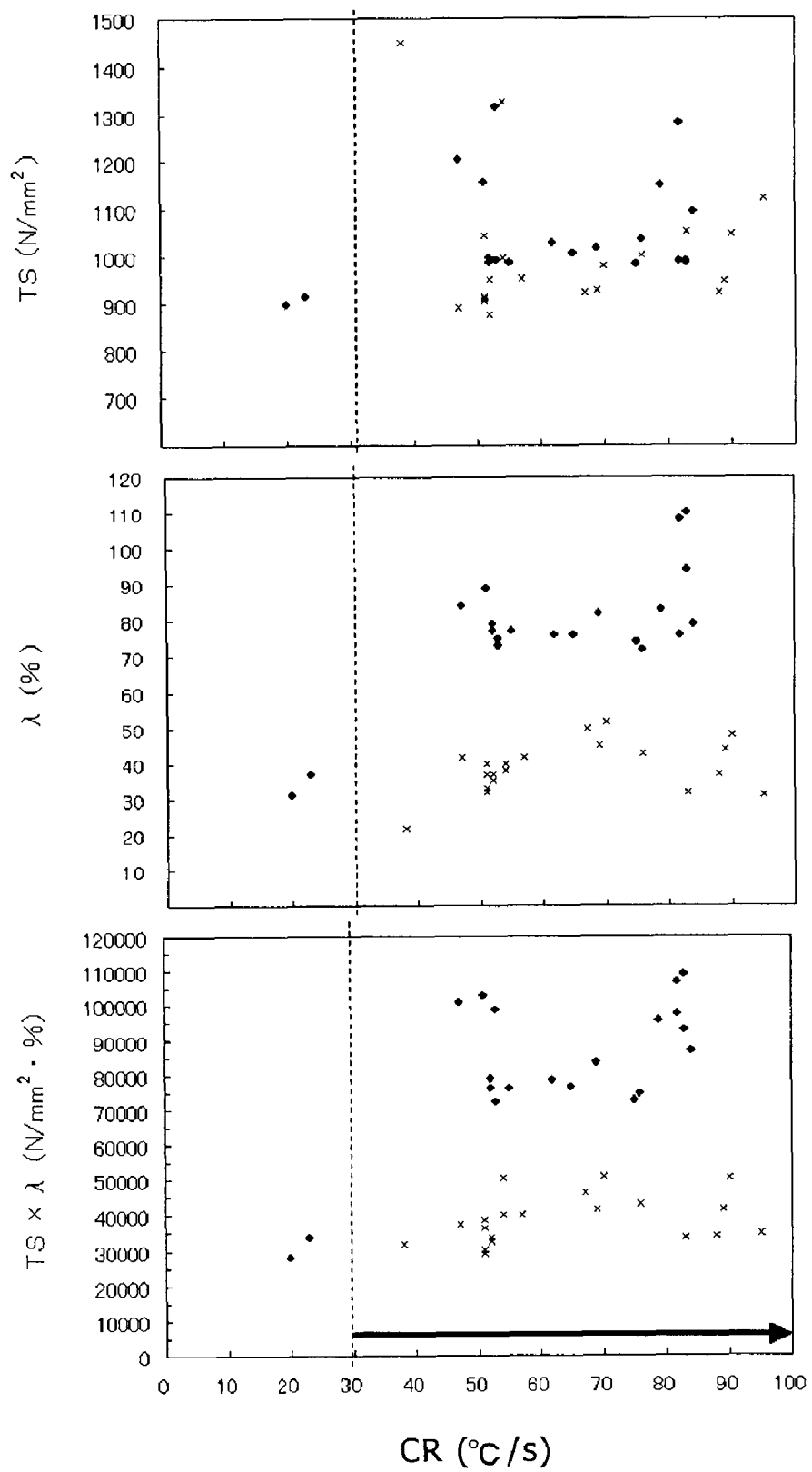
FIG. 5 presents graphs showing effects of cooling rate (CR) after the hot rolling on the tensile strength and stretch flangeability in the Examples.

In FIG. 1, the graphs show effects of the amount of martensite on the tensile strength and the stretch flangeability. In these graphs, the cases indicated by "×" are the cases in which the chemical composition or the hot rolling conditions are outside the scope of the present invention, and hole expansion ratio ($\lambda$) is low even when the amount of martensite is in excess of 80% by area. In FIG. 2, the graphs show effects of the C content on the tensile strength and the stretch flangeability. In these graphs, the cases indicated by "x" are the cases in which the chemical composition other than C or the hot rolling conditions are outside the scope of the present invention, and hole expansion ratio (λ) is low even when the C content is within the scope of the present invention. In FIG. 3, the graphs show effects of the Mo content on the tensile strength and the stretch flangeability. In these graphs, the cases indicated by "x" are the cases in which the chemical composition other than Mo or the hot rolling conditions are outside the scope of the present invention, and hole expansion ratio (λ) is low even when the Mo content is within the scope of the present invention. In FIG. 4, the graphs show effects of the coiling temperature (CT) on the tensile strength and the stretch flangeability. In these graphs, the cases indicated by "x" are the cases in which the chemical composition or the hot rolling conditions other than the coiling temperature (CT) are outside the scope of the present invention, and hole expansion ratio (λ) is low even when the coiling temperature (CT) is within the scope of the present invention. In FIG. 5, the graphs show effects of the cooling rate (CR) after the hot rolling on the tensile strength and the stretch flangeability. In these graphs, the cases indicated by "x" are the cases in which the chemical composition or the hot rolling conditions other than the cooling rate (CR) are outside the scope of the present invention, and hole expansion ratio (λ) is low even when the cooling rate (CR) is within the scope of the present invention.

The data indicated by "·" excluding the data indicated by "x" in the graphs confirm that high strength and high stretch flangeability (namely, well balanced strength and elongation) are realized within the scope of the present invention.

Figure 6:
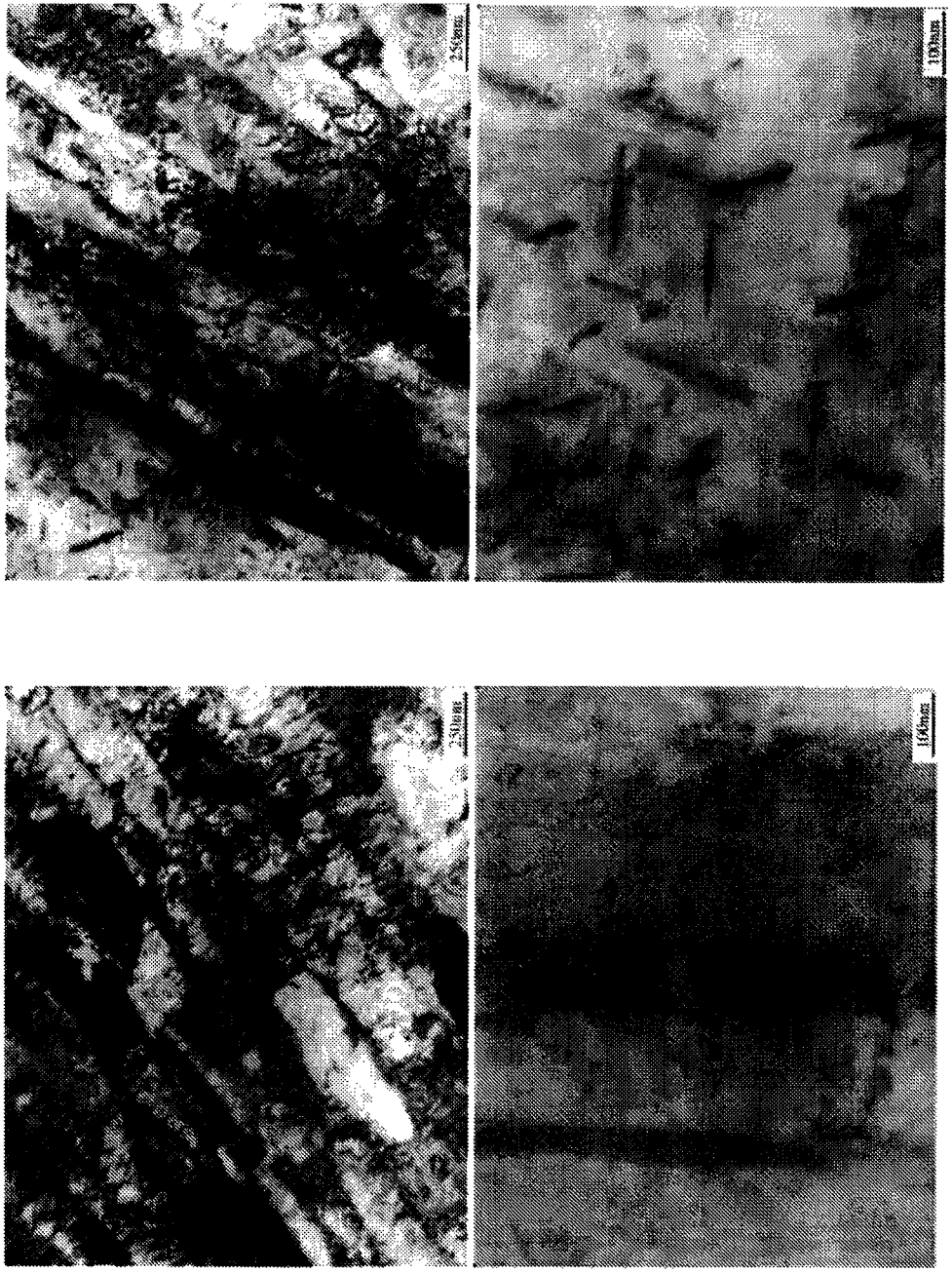
FIG. 6 presents pictures showing microstructure observed by transmission electron microscope for Experiment Nos. 3 and 31 in the Examples.

FIG. 6 shows pictures of the microstructure taken by transmission electron microscope for Experiment Nos. 3 and 31. As demonstrated in these pictures, the steel sheets coiled at the coiling temperature (CT) of 300° C. exhibit different microstructure. While precipitation is little observed in No. 3 having an adequate amount of Mo added thereto, precipitation is found in a large number in No. 31 prepared without adding the Mo, and such precipitation is believed to have adversely affected the stretch flangeability (λ).

TABLE 1

| Steel type | Steel composition (% by mass, the residue being Fe and inevitable contaminant) | | | | | | | | | | |
|---|---|---|---|---|---|---|---|---|---|---|---|
| No. | C | Si | Mn | P | S | Al | N | Cr | Mo | Misc. | $Ar_3$ |
| 1 | 0.10 | 1.12 | 1.87 | 0.008 | 0.003 | 0.038 | 0.0031 | 0.5 | 0.3 | Ca: 0.0017 | 865 |
| 2 | 0.07 | 1.13 | 1.93 | 0.007 | 0.002 | 0.031 | 0.0030 | 0.5 | 0.3 | Ca: 0.0019 | 870 |
| 3 | 0.04 | 1.09 | 1.89 | 0.008 | 0.003 | 0.042 | 0.0034 | 0.5 | 0.3 | Ca: 0.0018 | 888 |
| 4 | 0.03 | 0.74 | 1.95 | 0.009 | 0.003 | 0.035 | 0.0041 | 0.4 | 0.5 | Ni: 0.4 | 870 |
| 5 | 0.06 | 1.21 | 2.03 | 0.009 | 0.003 | 0.038 | 0.0038 | 0.6 | 0.4 | Ni: 0.7 | 870 |
| 6 | 0.10 | 0.43 | 1.99 | 0.007 | 0.003 | 0.040 | 0.0036 | 0.7 | 0.5 | B: 0.0033 | 834 |
| 7 | 0.04 | 1.16 | 2.01 | 0.009 | 0.002 | 0.041 | 0.0032 | 0.7 | 0.1 | B: 0.0018 | 879 |
| 8 | 0.08 | 1.11 | 1.82 | 0.008 | 0.003 | 0.039 | 0.0037 | 0.5 | 0.15 | | 868 |
| 9 | 0.10 | 1.10 | 1.83 | 0.008 | 0.003 | 0.036 | 0.0037 | 0.7 | 0.1 | | 856 |
| 10 | 0.02 | 0.87 | 2.02 | 0.008 | 0.002 | 0.038 | 0.0038 | 0.6 | 0.5 | | 890 |
| 11 | 0.02 | 1.26 | 1.94 | 0.010 | 0.003 | 0.040 | 0.0039 | 0.6 | 0.2 | | 902 |
| 12 | 0.12 | 1.01 | 1.82 | 0.008 | 0.003 | 0.037 | 0.0045 | 0.7 | 0.35 | | 854 |
| 13 | 0.08 | 1.38 | 2.10 | 0.008 | 0.003 | 0.038 | 0.0036 | 1.2 | 0 | | 859 |
| 14 | 0.13 | 0.91 | 2.02 | 0.009 | 0.002 | 0.044 | 0.0052 | 1.1 | 0 | | 829 |
| 15 | 0.08 | 0.03 | 1.87 | 0.008 | 0.003 | 0.038 | 0.0041 | 0.5 | 0.4 | | 826 |
| 16 | 0.07 | 0.09 | 0.42 | 0.009 | 0.003 | 0.032 | 0.0031 | 0.5 | 0.45 | | 875 |
| 17 | 0.07 | 1.06 | 1.87 | 0.008 | 0.003 | 0.037 | 0.0037 | 0.1 | 0.3 | | 876 |
| 18 | 0.04 | 1.19 | 1.99 | 0.010 | 0.002 | 0.038 | 0.0042 | 0.6 | 0.05 | | 880 |

TABLE 2

| | Steel | Hot rolling conditions | | | | | Area percentage | Mechanical properties | | | | |
|---|---|---|---|---|---|---|---|---|---|---|---|---|
| Exp. No. | type No. | SRT (° C.) | $Ar_3$ (° C.) | FDT (° C.) | CR (° C./sec) | CT (° C.) | of martensite (% by area) | YS (MPa) | TS (MPa) | El (%) | λ (%) | YR (%) |
| 1 | 1 | 1250 | 865 | 920 | 82 | Room temp. | 100 | 970 | 1281 | 9.9 | 76 | 76 |
| 2 | 1 | 1250 | | 911 | 53 | Room temp. | 100 | 1015 | 1316 | 10.1 | 75 | 77 |
| 3 | 1 | 1250 | | 923 | 51 | 300 | 100 | 1008 | 1157 | 9.8 | 89 | 87 |
| 4 | 1 | 1250 | | 919 | 52 | 350 | 97 | 790 | 987 | 9.6 | 77 | 80 |
| 5 | 1 | 1250 | | 927 | 51 | 400 | 74 | 642 | 906 | 13.2 | 40 | 71 |
| 6 | 1 | 1250 | | 916 | 54 | 450 | 36 | 645 | 997 | 14.6 | 40 | 65 |
| 7 | 1 | 1250 | | 920 | 52 | 500 | 19 | 582 | 950 | 15.4 | 35 | 61 |
| 8 | 2 | 1250 | 870 | 930 | 79 | Room temp. | 100 | 876 | 1152 | 10.2 | 83 | 76 |
| 9 | 2 | 1250 | | 916 | 84 | 300 | 99 | 827 | 1096 | 10.1 | 79 | 75 |
| 10 | 3 | 1250 | 888 | 915 | 82 | Room temp. | 100 | 746 | 988 | 10.6 | 108 | 76 |
| 11 | 3 | 1250 | | 912 | 83 | 300 | 97 | 752 | 989 | 10.2 | 110 | 76 |
| 12 | 3 | 1250 | | 927 | 83 | 350 | 99 | 749 | 986 | 9.7 | 94 | 76 |
| 13 | 4 | 1250 | 870 | 920 | 65 | 300 | 100 | 865 | 1005 | 10.3 | 76 | 86 |
| 14 | 4 | 1250 | | 913 | 23 | 300 | 43 | 621 | 914 | 14.6 | 37 | 68 |
| 15 | 5 | 1250 | 870 | 920 | 69 | 300 | 100 | 768 | 1017 | 10.4 | 82 | 76 |
| 16 | 5 | 1170 | | 927 | 52 | 300 | 96 | 823 | 998 | 10.3 | 79 | 82 |

TABLE 2-continued

| | Steel | Hot rolling conditions | | | | | Area percentage | Mechanical properties | | | | |
|---|---|---|---|---|---|---|---|---|---|---|---|---|
| Exp. No. | type No. | SRT (°C.) | $Ar_3$ (°C.) | FDT (°C.) | CR (°C./sec) | CT (°C.) | of martensite (% by area) | YS (MPa) | TS (MPa) | El (%) | λ (%) | YR (%) |
| 17 | 5 | 1080 | | 903 | 55 | 350 | 99 | 802 | 986 | 9.2 | 77 | 81 |
| 18 | 6 | 1250 | 854 | 912 | 47 | 300 | 100 | 1002 | 1203 | 9.8 | 84 | 83 |
| 19 | 7 | 1250 | 879 | 920 | 75 | 250 | 99 | 790 | 983 | 10.6 | 74 | 80 |
| 20 | 7 | 1250 | | 910 | 20 | 300 | 45 | 573 | 896 | 15.3 | 31 | 64 |

Note.
SRT, slab reheating temperature;
$Ar_3$, temperature of $Ar_3$ transformation,
FDT, finishing delivery temperature;
CR, cooling rate after the hot rolling;
CT, coiling temperature,
TS, tensile strength;
YS, yield strength;
El, elongation,
λ, hole expansion rate,
YR, yield ratio.

TABLE 3

| | Steel | Hot rolling conditions | | | | | Area percentage | Mechanical properties | | | | |
|---|---|---|---|---|---|---|---|---|---|---|---|---|
| Exp. No. | type No. | SRT (°C.) | $Ar_3$ (°C.) | FDT (°C.) | CR (°C./sec) | CT (°C.) | of martensite (% by area) | YS (MPa) | TS (MPa) | El (%) | λ (%) | YR (%) |
| 21 | 8 | 1250 | 854 | 926 | 62 | 300 | 92 | 784 | 1029 | 10.1 | 76 | 76 |
| 22 | 8 | 1250 | | 869 | 53 | 350 | 89 | 820 | 992 | 10.9 | 73 | 83 |
| 23 | 8 | 1250 | | 822 | 57 | 350 | 75 | 764 | 953 | 11.8 | 42 | 80 |
| 24 | 9 | 1250 | 868 | 922 | 76 | 300 | 87 | 790 | 1037 | 10.7 | 72 | 76 |
| 25 | 10 | 1250 | 890 | 916 | 47 | 250 | 67 | 631 | 890 | 15.1 | 42 | 71 |
| 26 | 11 | 1250 | 902 | 914 | 52 | 300 | 55 | 582 | 876 | 16.3 | 37 | 66 |
| 27 | 11 | 1250 | | 919 | 51 | 250 | 59 | 591 | 913 | 15.1 | 32 | 65 |
| 28 | 11 | 1250 | | 922 | 51 | 300 | 66 | 603 | 911 | 14.5 | 33 | 66 |
| 29 | 12 | 1250 | 866 | 921 | 54 | 350 | 100 | 1027 | 1326 | 8.3 | 38 | 77 |
| 30 | 13 | 1250 | 862 | 917 | 95 | 350 | 100 | 883 | 1124 | 8.8 | 31 | 79 |
| 31 | 13 | 1250 | | 912 | 83 | 300 | 99 | 760 | 1053 | 7.2 | 32 | 72 |
| 32 | 13 | 1250 | | 918 | 51 | 300 | 99 | 692 | 1045 | 10.4 | 37 | 66 |
| 33 | 14 | 1180 | 859 | 925 | 38 | 250 | 98 | 1175 | 1450 | 8.6 | 22 | 81 |
| 34 | 15 | 1150 | 822 | 912 | 90 | 300 | 100 | 812 | 1047 | 10.6 | 48 | 78 |
| 35 | 15 | 1150 | | 907 | 76 | 300 | 98 | 773 | 1003 | 11.2 | 43 | 77 |
| 36 | 16 | 1200 | 875 | 900 | 88 | 350 | 69 | 619 | 921 | 14.8 | 37 | 67 |
| 37 | 17 | 1100 | 879 | 925 | 67 | 300 | 76 | 587 | 922 | 13.9 | 50 | 64 |
| 38 | 17 | 1170 | | 918 | 89 | 300 | 68 | 602 | 946 | 15.1 | 44 | 64 |
| 39 | 17 | 1170 | | 913 | 69 | 300 | 73 | 654 | 927 | 14.6 | 45 | 71 |
| 40 | 18 | 1250 | 880 | 916 | 70 | 250 | 99 | 742 | 981 | 10.2 | 52 | 76 |

Note.
SRT, slab reheating temperature;
$Ar_3$, temperature of $Ar_3$ transformation,
FDT, finishing delivery temperature;
CR, cooling rate after the hot rolling;
CT, coiling temperature,
TS, tensile strength;
YS, yield strength;
El, elongation,
λ, hole expansion rate,
YR, yield ratio.

What is claimed is:

1. A hot rolled steel sheet comprising 0.03 to 0.10% (the percent hereinafter representing % by mass in the case of chemical components) of C,
   0.5 to 2.0% of Si,
   1.82 to 2.5% of Mn,
   0.02 to 0.10% of Al,
   0.2 to 1.5% of Cr, and
   0.1 to 0.5% of Mo and the balance being Fe and unavoidable impurities, wherein
   at least 80% by area in longitudinal cross section has a martensitic structure; and wherein said hot rolled steel sheet does not contain Ti.

2. The hot rolled steel sheet according to claim 1, further comprising 0.0005 to 0.0050% of B.

3. The hot rolled steel sheet according to claim 1, further comprising 0.1 to 2.0% of Ni.

4. The hot rolled steel sheet according to claim 1, further comprising 0.0005 to 0.0050% of Ca.

5. The hot rolled steel sheet according to claim 1, wherein the steel sheet has a tensile strength of at least 980 MPa.

6. A method for producing the hot rolled steel sheet, wherein the hot rolling is conducted at a finishing delivery temperature of not lower than $Ar_3$ transformation temperature, and the steel sheet after the hot rolling is cooled at a rate of at least 30° C/sec and coiled at a temperature of less than 400° C.,
   wherein said hot rolled steel sheet comprises:
      0.03 to 0.10% (the percent hereinafter representing % by mass in the case of chemical components) of C,
      0.5 to 2.0% of Si,
      1.82 to 2.5% of Mn,
      0.02 to 0.10% of Al,
      0.2 to 1.5% of Cr, and
      0.1 to 0.5% of Mo and the balance being Fe and unavoidable impurities, wherein
      at least 80% by area in longitudinal cross section has a martensitic structure.

7. The hot rolled steel sheet according to claim 1, wherein the steel sheet comprises 0.03 to 0.08% of C.

8. The hot rolled steel sheet according to claim 1, wherein the steel sheet comprises 0.03 to 0.07% of C.

9. The hot rolled steel sheet according to claim 1, wherein the steel sheet comprises 0.2 to 0.4% of Mo.

10. The hot rolled steel sheet according to claim 8, wherein the steel sheet comprises 0.3 to 0.4% of Mo.

11. The hot rolled steel sheet according to claim 1, wherein the steel sheet comprises 1.82 to 2.0% of Mn.

12. The hot rolled steel sheet according to claim 1, wherein the steel sheet comprises 0.03 to 0.05% of Al.

13. The hot rolled steel sheet according to claim 1, wherein the steel sheet comprises 0.5 to 1.0% of Cr.

14. The hot rolled steel sheet according to claim 1, further comprising 0.0010 to 0.005% of B.

15. The hot rolled steel sheet according to claim 1, further comprising 0.2 to 2.0% of Ni.

16. The hot rolled steel sheet according to claim 1, further comprising 0.0010 to 0.0050% of Ca.

17. The hot rolled steel sheet according to claim 1, wherein at least 90% by area in longitudinal cross section has a martensitic structure.

* * * * *